United States Patent [19]
Lanzilotta

[11] 3,793,148
[45] Feb. 19, 1974

[54] MICROBIOLOGICAL REDUCTION OF 1,3,-DIOXO-2-ALKYLCYCLOALKANES

[75] Inventor: Raymond P. Lanzilotta, San Jose, Calif.

[73] Assignee: Syntex Corporation

[22] Filed: July 24, 1972

[21] Appl. No.: 274,297

[52] U.S. Cl. ............................................. 195/51 R
[51] Int. Cl. .............................................. C12b 1/00
[58] Field of Search .................................. 195/51 R

[56] References Cited
UNITED STATES PATENTS
3,432,393   3/1969   Bellet et al. ................... 195/51 R
3,579,544   5/1971   Hiraga et al. .................. 195/51 R
3,616,226   10/1971  Isono et al. ................... 195/51 R

*Primary Examiner*—Alvin E. Tanenholtz
*Attorney, Agent, or Firm*—Evelyn K. Merker

[57] ABSTRACT

An improved method of microbiologically reducing a 1,3-dioxo-2-alkylcycloalkane using members of a group of compounds which increase the production of the 1$\beta$-hydroxy-2$\beta$-alkyl-3-oxocycloalkane product. The products are useful as intermediates in the total synthesis of useful steroid compounds. Alkyl alcohol and acrylonitrile are illustrated as representative of the useful group of compounds.

16 Claims, No Drawings

MICROBIOLOGICAL REDUCTION OF 1,3,-DIOXO-2-ALKYLCYCLOALKANES

The present invention relates to an improved method of reducing oxo-containing compounds by microbiological means. In particular, the present invention is directed to an improved method of effecting the selective microbiological reduction of symmetrical dioxocycloalkanes to the corresponding optically active oxohydroxycycloalkanes.

The use of microorganisms to effect the reduction of an oxo group has been described, for example, in U.S. Pat. Nos. 3,432,393, 3,481,974, 3,562,112, and 3,616,226.

The reduction of symmetrical 2-alkylcycloalkane-1,3-diones as described therein, e.g., a 13-carbyl-8,14-secogona-14,17-dione, results in a mixture of products wherein each of the 2-alkyl group and resultant 1-hydroxy group (i.e., the 13-carbyl and resultant 17-hydroxy groups of the 8,14-secogona compound) is in the alpha and beta positions. Inasmuch as the reduced products are useful as intermediates for the preparation of pharmacologically active steroid compounds, the optically active $1\beta,2\beta(17\beta,13\beta)$ reduction product is most useful and therefore desired. However, the prior art methods have not been altogether successful in selectively producing this desirable isomer in reproducibly attractive yields.

Now it has been discovered that symmetrical dioxocycloalkanes can be microbiologically reduced in good and improved yields of the selected $1\beta,2\beta$ isomer product by the use of certain microbiological species together with members of a group of compounds which unexpectedly increase the selective reduction. In accordance herewith, selective reduction with enhanced production of the $1\beta$-hydroxy-$2\beta$-alkyl product is effected by utilizing microbiological species of the genus Saccharomyces and Schizosaccharomyces genera together with a member of a group of enhancer compounds. The microbiological species interacts with the enhancer compound to afford increased yields and throughout of the desired $1\beta,2\beta$ reduction isomer.

The present invention thus involves an improvement of the process of microbiologically reducing a 1,3-dioxo-2-alkylcycloalkane which comprises employing a microorganism selected from the Saccharomyces and Schizosaccharomyces genera together with a compound selected from the group consisting of allyl alcohol, methallyl alcohol, acrylonitrile, methacrylonitrile, acrylic aldehyde, α-methylacrylic aldehyde, α,β-unsaturated ketones, and α-methyl-α,β-unsaturated ketones, said compound being employed in an amount sufficient to enhance the production of the $1\beta$-hydroxy-$2\beta$-alkyl-3-oxocycloalkane product, and optionally recovering said product.

Cultures of species of the Genera Saccharomyces and Schizosaccharomyces which can be employed in the process of the present invention are available from known sources, such as the American Type Culture Collection (ATCC), Rockville, Maryland; the Northern Utilization Research and Development Branch, U.S. Department of Agriculture (NRRL), Peoria, Illinois; and Centralalbureau voor Schimmelcultures (CBS), Baarn, Holland. The following species are typical of those available from the above sources and are representative of those which can be employed in the process of the present invention.

| | | |
|---|---|---|
| *Saccharomyces cerevisieae* | ATCC 4097 | Y-147 NRRL |
| *Saccharomyces uvarum* | ATCC 10609 | Y-672 NRRL |
| *Saccharomyces pastorianus* | ATCC 12752 | Y-1551 NRRL |
| *Schizosaccharomyces japonicus* | ATCC 10660 | Y-1361 NRRL |
| *Schizosaccharomyces malidevorans* | CBS 5557 | |
| *Schizosaccharomyces octosporus* | ATCC 2479 | Y-854 NRRL |
| | ATCC 4206 | |
| *Schizosaccharomyces pombe* | ATCC 2476 | Y-164 NRRL |
| | ATCC 2478 | Y-9 NRRL |
| | ATCC 14548 | |
| | ATCC 16491 | |
| | ATCC 16979 | |
| *Schizosaccharomyces versatilis* | ATCC 9987 | Y-1026 NRRL |

Of particular importance are the strains *Schizosaccharomyces pombe* ATCC 2476 and *malidevorans* CBS 5557 and *Saccharomyces cerevisieae* ATCC 4097 and *uvarum* ATCC 10609.

In addition to allyl alcohol, methallyl alcohol, acrylonitrile, methacrylonitrile, acrylic aldehyde, and α-methylacrylic aldehyde, useful enhancer compounds include α,β-unsaturated ketones and α-methyl-α,β-unsaturated ketones containing from three to about 12 carbon atoms, including 3-oxo-6-carbomethoxy-n-hex-1-ene, cyclohex-1-en-3-one, methyl vinyl ketone, methyl isopropenyl ketone, ethyl vinyl ketone, ethyl isopropenyl ketone, propyl vinyl ketone, propyl isopropenyl ketone, non-1-en-3-one, dodec-1-en-3-one, and the like. In general, certain of the useful enhancer compounds hereof can be represented by the following general formula:

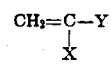

wherein X is hydrogen or methyl, and Y is hydroxymethyl, cyano, formyl, or acyl. Typical acyl groups include acetyl, propionyl, butyryl, hexanoyl, decanoyl, benzoyl, and the like. Preferred enhancer compounds are allyl alcohol, acrylonitrile, acrylic aldehyde (acrolein), methyl vinyl ketone, and 3-oxo-6-carbomethoxy-n-hex-1-ene. Particularly preferred are allyl alcohol, acrylonitrile and acrylic aldehyde.

As useful substrates for the present process are a wide variety of symmetrical 1,3-dioxocycloalkanes, such as those defined in U.S. Pat. No. 3,432,393 and, particularly, those depicted by the following formula:

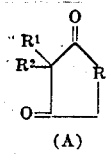

(A)

wherein,
R is methylene or ethylene;
$R^1$ is methyl, ethyl, or propyl;
$R^2$ is a linear group containing three to 18 carbon atoms, inclusive, or a cyclic group of the partial formulas:

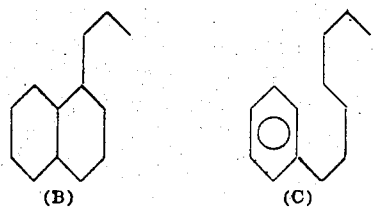

(B)  (C)

and derivatives thereof wherein the linear group and cyclic groups are optionally substituted and unsaturated. These optional substituents, in the case of the linear group, are selected from oxo, carboxy, carboalkyloxy, hydroxy, acyloxy, alkyloxy, alkyl, aryl, cycloalkyl, or halo and, in the case of the cyclic groups, oxo, hydroxy, acyloxy, alkyloxy, alkyl, or halo. The optional unsaturation is present as one or more double bonds (olefinic unsaturation).

The process of the present invention, as defined above, can be depicted in accordance with the following equation:

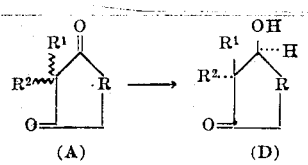

wherein each of R, $R^1$ and $R^2$ are as defined hereinabove.

The process of the present invention is particularly useful for preparing, in a first group, 1β-hydroxy-2β-methyl-or -ethyl-3-oxocyclopentanes (D; R is methylene, $R^1$ is methyl or ethyl) and, in a second group, those compounds of the first group wherein $R^2$ is a member selected from the group consisting of: 2-carboalkyloxyethyl, 3-oxo-n-butyl, 3-oxo-n-pentyl, 3-oxo-6-carboalkyloxy-n-hexyl, 3,7-dioxo-n-octanyl, 3,7-dioxo-n-nonanyl, and a group of the formula:

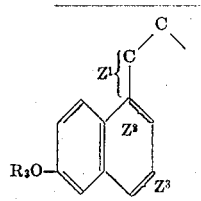

in which $R^3$ is lower alkyl, cyclopentyl, cyclohexyl, or lower hydrocarbon carboxylic acyl and each of $Z^1$, $Z^2$ and $Z^3$ is a carbon-carbon single bond or a carbon-carbon double bond, provided that (1) when $Z^1$ is a double bond then each of $Z^2$ and $Z^3$ is a single bond and (2) when $Z^1$ is a single bond then each of $Z^2$ and $Z^3$ is a single bond or each of $Z^2$ and $Z^3$ is a double bond or $Z^2$ is a double bond and $Z^3$ is a single bond. Particularly preferred as substrates are 2-carboalkyloxyethyl, 3-oxo-6-carboalkyloxy-n-hexyl, 2-(6-methoxy-1,2,3,4-tetrahydronaphth-2-yl)-ethyl, 2-(6-methoxy-3,4-dihydronaphth-2-yl)-ethyl, and 2,2-(6-methoxy-1,2,3,4-tetrahydronaphth-2-ylidene)-ethyl.

The 1β-hydroxy-2β-alkyl-3-oxocycloalkane products of the process of the present invention are useful as intermediates in the preparation of known and useful steroid compounds by total synthetic methods known in the art. By virtue of this utility, the cycloalkane ring is destined as Ring D of the steroid nucleus and, therefore, the substituents represented by $R^1$ and, particularly $R^2$, are chosen in identity according to the preparation of known and basic steroid compounds having useful properties. The above-cited U.S. patents, as well as numerous other patents and literature references, document the known synthetic sequences in which the products hereof are useful. An important aspect in these synthetic methods involves the use of an optically resolved 1β-hydroxy-2β-alkyl-3-oxocycloalkane, as noted supra. The instant invention permits the unexpected high yield obtention of the particularly suitable optical isomer useful for further elaboration in the synthetic sequence of preparing a steroid nucleus having proper stereochemistry, i.e., the 1β,2β-isomer.

In accordance herewith, the microbiological reduction is conducted by contacting a 1,3-dioxo-2-alkylcycloalkane with a species of the genera Saccharomyces or Schizosaccharomyces together with a member of a class of enhancer compounds. This reduction is conducted at temperatures ranging from about 20° C to about 35° C for a period of time sufficient to produce reduction, preferably ranging from about 24 hours to about 120 hours. The reduction is conveniently conducted in a nutrient medium which contains sources of carbon, minerals, nitrogen, and vitamins. The media preferably has an adjusted pH level. The incubation is further conducted under aerobic conditions.

In carrying out the reduction process, the microorganism enhancer compound, and substrate are contacted and maintained together in any order or fashion convenient and acceptable with conventional microbial fermentation techniques. The reactants are maintained together in a suitable nutrient medium within the given temperature range and for a period of time sufficient to produce reduction. Upon the completion of the reduction, the mixture is processed by conventional manners to isolate and recover the product. Such manners include filtration, decantation, extraction, evaporation, chromatography, and so forth.

As sources for carbon are employed, the various known and usually employed materials high in carbohydrates such as sugars, starches, and lower organic hydrocarbons.

Minerals are supplied by the addition of inorganic salts. Sufficient amounts of minerals are often present in the other ingredients making up the fermentation medium for the present process.

As nitrogen sources there can be employed, for example, peptone, soya bean meal, corn steep liquor, yeast extract, caseine, hydrolyzate, and the like.

Vitamin sources generally include those sources useful in supplying the other necessary nutrients. Yeast extract is especially useful as a vitamin source.

The pH of the employed medium is preferably adjusted to about 3.5 to about 4.5 conveniently with mineral acids, e.g., hydrochloric acid.

For the purposes of the present invention, the term "an amount sufficient to increase the production of the 1β-hydroxy-2β-alkyl-3-oxocycloalkane product" will vary depending upon particular substrate choice and enhancer compound choice. In general, enhancer compound is employed in an amount sufficient to provide a ratio of enhancer compound to substrate of from about 1:1000 to about 1:10, by weight.

The process of the present invention can be carried out conveniently by first cultivating the microorganism in a suitable medium containing adequate carbon, mineral, nitrogen, and vitamin nutrients. The cultivating medium is conveniently kept under sterile, aerobic conditions and at from about 20° C to about 35° C for from about 12 to about 48 hours. During this time, the medium is conveniently agitated.

Following the cultivation period, the culture is transferred, preferably under sterile conditions, to a medium of the same or different nutrient composition for incubation. The culture is preferably allowed to further grow in this medium for from about 8 hours to about 20 hours. After this additional growth period, if employed, the substrate and the enhancer compound are added and the resultant mixture is agitated under aerobic conditions within the given temperature and time ranges. The enhancer compound can be added in a single total amount or it can be added to the medium by means of multiple additions of fractions of the total amount employed and over the whole or part of the incubation reduction. After this time, the product can be isolated by column chromatography with an adequate eluant or by other conventional means.

In one embodiment, the culture is transferred from agar slants, upon which it is maintained, to a prepared nutrient medium as defined above. The culture is allowed to grow in this medium at about the same temperature and preferably with agitation. After the growth period, the culture is used as inoculum for a nutrient medium of the same or different composition. The culture is preferably allowed to grow further in the new medium after inoculation.

After the culture has attained a satisfactory stage of growth, the substrate, conveniently together with enhancer compound, is added to the medium, preferably as a solution in organic solvent, and the incubation is allowed to proceed. Suitable solvents include acetone, methanol, ethanol, propanol, dioxane, tetrahydrofuran, dimethylsulfoxide, dimethyl formamide, and the like, or mixtures thereof. Substrate dissimilation abd product formation can be followed through the use of thin-layer or paper chromatography of aliquot samples. Column chromatography is preferably employed for the separation and purification of product at reaction end.

The following examples further illustrate the manner by which the present invention can be practiced and represent, in one aspect, the best mode for carrying out the invention. As such, however, they should not be construed merely as illustrative and not as limitative upon the overall scope hereof.

EXAMPLE 1

Cells from a 13 to 14 day culture of *Schizosaccharomyces pombe* (ATCC 2476) are harvested from malt extract-peptone (MP-3) agar medium and used to inoculate 250 ml. incubation flasks containing 50 ml. portions of nutrient broth of the following composition:

beef extract—3.0 g.
peptone—5.0 g.
cerelose—20.0 g.
$H_2O$ (dist.)—1,000 ml.

The cultures are incubated on a rotary shaker at 23° C for 30 hours. After this period, 5 ml. portions of the culture medium are used to inoculate 50 ml. portions of a separate nutrient broth-cerelose medium of the same composition. After inoculation, the culture is allowed to grow aerobically for an additional 18 hours. At the end of this period, 25 mg. of 1,3-dioxo-2-(3-oxo-6-carbomethoxy-n-hexyl)-2-methylcyclopentane substrate in 0.2 ml. of acetone and a second 25 mg. amount of substrate in acetone after 4 to 5 hours and a third 25 mg. amount of substrate in acetone after 10 to 12 hours are added to each medium portion while the incubation is continued at from 22° C to about 24° C with continued shaking as before.

3-Oxo-6-carbomethoxy-n-hex-1-ene in concentration levels of 0.5 mg. and 0.25 mg. per 50 ml. medium portions are also added as acetone solutions (10 $\mu$l. and 20 $\mu$l., respectively) at the same time as the first addition of the substrate. Two 50 ml. medium portions receive 10 $\mu$l. and 20 $\mu$l. of acetone, respectively, but no 3-oxo-6-carbomethoxy-n-hex-1-ene, and serve as controls.

The incubation is allowed to proceed in this manner. Two milliliter aliquots are periodically withdrawn from the inoculum mixture after the last addition of substrate to determine the extent and rate of reduction. In this determination, each aliquot is extracted with one-half volume of chloroform. The chloroform extracts are separated by thin layer chromatography on silica gel using an 80:20 (v/v) solvent system of chloroform-:acetone and the usual detection method employing a spray with 3 percent ceric sulfate in 3N sulfuric acid solution and heating to 110° C.

After 24 hours, a chromatogram conducted, as above described, indicates a greater conversion of substrate to the 1$\beta$-hydroxy-2$\alpha$-(3-oxo-6-carbomethoxy-n-hexyl)-2$\beta$-methyl-3-oxocyclopentane product with the media containing 3-oxo-6-carbomethoxy-n-hex-1-ene as compared with the controls.

After 120 hours, a similar chromatogram shows a more dramatic enhancement of the 1$\beta$-hydroxy-2$\beta$-methyl product with very little or no by-product and remaining substrate for the 3-oxo-6-carbomethoxy-n-hex-1-ene treated samples while the untreated samples show a relatively poor conversion of substrate to desired 1$\beta$-hydroxy-2$\beta$-methyl product and a greater ratio of by-product to desired product.

EXAMPLE 2

The procedure of Example 1 is repeated except the compounds listed below in the designated amounts are added to individual 50 ml. medium portions in lieu of the amounts of 3-oxo-6-carbomethoxy-n-hex-1-ene added as recited therein.

| Medium Portion No. | Compound Added | Amount, Mg. (in acetone) |
| --- | --- | --- |
| 1 | none (control) | — |
| 2 | methyl vinyl ketone | 0.25 |
| 3 | do. | 0.125 |
| 4 | acrylic aldehyde | 1.25 |
| 5 | do. | 0.25 |
| 6 | do. | 0.125 |
| 7 | allyl alcohol | 1.25 |
| 8 | do. | 0.25 |
| 9 | do. | 0.125 |
| 10 | acrylonitrile | 0.125 |
| 11 | do. | 1.25 |
| 12 | cyclohex-1-en-3-one | 2.50 |
| 13 | do. | 0.50 |
| 14 | do. | 0.25 |
| 15 | methyl ethynyl ketone | 0.125 |

Chromatograms taken as described in Example 1 at 24, 48, and 120 hours after the addition of substrate, show an enhancement of the production of the 1$\beta$-hydroxy-2$\beta$-methyl-2$\alpha$-(3-oxo-6-carbomethoxy-n-hexyl)-3-oxocyclopentane product for each of medium portions No. 2 to 15 as compared with control (No. 1).

EXAMPLE 3

The procedure of Example 1 is repeated except a total of seven 25 mg. additions of substrate in acetone are made to the 50 ml. medium portions in lieu of the three such additions. The first addition is made 18 hours after incubation and the other additions as follows: 5, 12, 24, 32, 48, and 56 hours after the first addition.

In the present procedure, one medium portion (No. 1) receives substrate only and No. 2 receives 0.25 mg. of 3-oxo-6-carbomethoxy-n-hex-1-ene with each addition of substrate.

Chromatograms made 120 hours after the first addition of substrate indicate a greater amount of desired 1$\beta$-hydroxy-2$\beta$-methyl product in No. 2 compared with control.

EXAMPLE 4

The procedure of Example 3 is repeated except allyl alcohol is used in lieu of 3-oxo-6-carbomethoxy-n-hex-1-ene and two portions are employed, one receiving substrate only (control) and the other 0.50 mg. of allyl alcohol with each of the seven additions of 40 mg. each of substrate. In each portion, each addition after the third is accompanied by 0.6 ml. of nutrient broth-cerelose solution of the composition:

beef extract—30.0 g.
peptone—50.0 g.
cerelose—200.0 g.
$H_2O$ (dist.)—1,000 ml.

Chromatograms made 24, 48, and 120 hours after the first addition of substrate indicate an enhanced conversion to the desired 1$\beta$-hydroxy-2$\beta$-methyl-2$\alpha$-(3-oxo-6-carbomethoxy-n-hexyl)-3-oxocyclopentane as compared with the control.

EXAMPLE 5

The procedure of Example 4 is repeated except seven pairs of incubation flasks are used, all containing 50 ml. of nutrient broth and 2 percent cerelose medium. Supplement additions of nutrient broth and cerelose are made as described in Example 4. One of the seven pairs receives allyl alcohol (10 $\mu$g./ml. medium) with only the first of seven additions of 40 mg. each of substrate. The second pair receives allyl alcohol (10 $\mu$g./ml. medium/addition) with the first two of seven additions of 40 mg. each of substrate, and so forth up to seven additions of allyl alcohol with seven additions of substrate at the same concentration levels.

Chromatograms are made, as described above, 0, 18, 23, 40, and 64 hours after the first addition of substrate. These indicate that dissimilation of substrate and production of the desired 1$\beta$-hydroxy-2$\beta$-methyl product is greatest with the pair of flasks receiving seven additions of allyl alcohol with the respective seven additions of substrate. Also shown is the increase of substrate dissimilation and production of desired 1$\beta$-hydroxy-2$\beta$-methyl product over the control with increasing numbers of allyl alcohol additions.

EXAMPLE 6

The procedure of Example 1 is repeated except that 0.50 mg. of allyl alcohol as enhancer is added with each of the three additions of substrate and the following microorganisms are used in lieu of *Schizosaccharomyces pombe* ATCC 2476:

*Saccharomyces cerevisieae*—ATCC 4097
*Saccharomyces uvarum*—ATCC 10609
*Saccharomyces pastorianius*—ATCC 12752
*Schizosaccharomyces malidevoraus*—CBS 5557

Chromatograms taken at 24 and 48 hours after the first addition indicate the enhanced conversion to the desired 1$\beta$-hydroxy-2$\beta$-methyl-2$\alpha$-(3-oxo-6-carbomethoxy-n-hexyl)-3-oxocyclopentane product as compared with the control.

EXAMPLE 7

The procedure of Example 5 is repeated using 1,3-dioxo-2-(2-carbomethoxyethyl)-2-methylcyclopentane to obtain enhanced amounts of the desired 1$\beta$-hydroxy-2$\alpha$-(2-carbomethoxyethyl)-2$\beta$-methyl-3-oxocyclopentane product over the control.

In accordance with the foregoing methods, the following are performed.

By incubating 1,3-dioxo-2-(3-oxo-n-butyl)-2-ethylcyclohexane with *Schizosaccharomyces pombe* (ATCC 16491) and allyl alcohol (0.5 mg.) in a nutrient medium of the composition of Example 1, there is obtained enhanced amounts of the 1$\beta$-hydroxy-2$\alpha$-(3-oxo-n-butyl)-2$\beta$-ethyl-3-oxocyclopentane product, compared with control receiving no allyl alcohol.

By incubating 1,3-dioxo-2-(3-chlorobut-2-enyl)-2-n-propylcyclopentane with *Schizosaccharomyces japonicus* (ATCC 10660) and acrolein (1.25 mg.) in a nutrient medium of the composition of Example 1, there is obtained enhanced amounts of the 1$\beta$-hydroxy-2$\alpha$-(3-chlorobut-2'-enyl)-2$\beta$-n-propyl-3-oxocyclopentane product, compared with control receiving no acrolein.

By incubating 3-methoxy-8,14-secoestra-1,3,5(10),9(11)-tetraene-14,17-dione with *Schizosaccharmoyces octosporus* (ATCC 2479) and methyl ethynyl ketone, there is obtained enhanced amounts of the 3-methoxy-8,14-secoestra-1,3,5(10),9(11)-tetraen-17$\beta$-ol-14-one product, compared with control receiving no methyl ethynyl ketone.

By incubating 8,14-secoestra-1,3,5(10),8-tetraen-3-ol-14,17-dione with *Schizosaccharomyces pombe* (ATCC 2476) and acrylonitrile in a nutrient medium of the composition of the Example 1, there is obtained enhanced amounts of the 8,14-secoestra-1,3,5(10),8-tetraene-3$\beta$,17$\beta$-diol-14-one product, compared with control receiving no acrylonitrile.

By incubating 3-ethoxy-8,14-secoestra-1,3,5(10)-triene-14,17-dione with Schizosaccharomyces pombe (ATCC 2478) and methyl ethynyl ketone in a nutrient medium of the composition of the Example 1, there is obtained enhanced amounts of the 3-ethoxy-8,14-secoestra-1,3,5-(10)-trien-17$\beta$-ol-14-one product, compared with control receiving no methyl ethynyl ketone.

By incubating 1,3-dioxo-2-(2-carbopropoxyethyl)-2-ethylcyclohexane with *Schizosaccharomyces pombe* (ATCC 14548) and allyl alcohol in a nutrient medium of the composition of Example 1, there is obtained enhanced amounts of the 1$\beta$-hydroxy-2$\alpha$-(2-carbopropoxyethyl)-2$\beta$-ethylcyclohexane product, compared with control receiving no allyl alcohol.

Among the products prepared in accordance with the foregoing methods are the following:

1β-hydroxy-2α-(3-oxo-n-butyl)-2β-methyl-3-oxocyclopentane,
1β-hydroxy-2α-(3-oxo-n-butyl)-2β-ethyl-3-oxocyclopentane,
1β-hydroxy-2α-(3-oxo-n-butyl)-2β-ethyl-3-oxocyclohexane,
1β-hydroxy-2α-(3-oxo-n-pentyl)-2β-methyl-3-oxocyclopentane,
1β-hydroxy-2α-(3-oxo-6'-carboethoxy-n-hexyl)-2β-methyl-3-oxocyclopentane,
1β-hydroxy-2α-(3-oxo-6'-carboethoxy-n-hexyl)-2β-ethyl-3-oxocyclopentane,
1β-hydroxy-2α-(3-oxo-6'-carboethoxy-n-hexyl)-2β-methyl-3-oxocyclohexane,
1β-hydroxy-2α-(carbomethoxyethyl)-2β-methyl-3-oxocyclopentane,
1β-hydroxy-2α-(carboethoxyethyl)-2β-ethyl-3-oxocyclopentane,
1β-hydroxy-2α-(carboethoxyethyl)-2β-ethyl-3-oxocyclohexane,
1β-hydroxy-2α-(3,7-dioxo-n-octanyl)-2β-methyl-3-oxocyclopentane,
1β-hydroxy-2α-(3,7-dioxo-n-octanyl)-2β-methyl-3-oxocyclohexane,
1β-hydroxy-2α-(3,7-dioxo-n-nonanyl)-2β-methyl-3-oxocyclopentane,
1β-hydroxy-2α-(3,7-dioxo-n-nonanyl)-2β-methyl-3-oxocyclohexane, and
1β-hydroxy-2α-(3,7-dioxo-n-octanyl)-2β-ethyl-3-oxocyclopentane.

What is claimed is:

1. Process for microbiologically reducing a 1,3-dioxo-2-alkylcycloalkane substrate which comprises subjecting said substrate to the action of a microorganism selected from the Saccharomyces and Schizosaccharomyces genera in the presence of a compound selected from the group consisting of allyl alcohol, methallyl alcohol, acrylonitrile, methacrylonitrile, acrylic aldehyde, α-methylacrylic aldehyde, and α,β-unsaturated ketones and α-methyl-α,β-unsaturated ketones containing from three to about 12 carbon atoms, said compound being present in an amount sufficient to enhance the production of the 1β-hydroxy-2β-alkyl-3-oxocycloalkane product and recovering said product.

2. The process according to claim 1 wherein the 1,3-dioxo-2-alkylcycloalkane substrate is one of the formula:

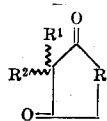

and the corresponding product 1β-hydroxy-2β-alkyl-3-oxocycloalkane is of the formula:

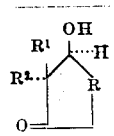

wherein,
R is methylene or ethylene,
R¹ is methyl, ethyl, or propyl; and
R² is a member selected from the group consisting of: 2-carboalkyloxyethyl, 3-oxo-n-butyl, 3-oxo-n-pentyl, 3-oxo-6-carboalkyloxy-n-hexyl, 3,7-dioxo-n-octanyl, 3,7-dioxo-n-nonanyl, and

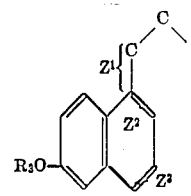

in which R³ is a lower alkyl, cyclopentyl, cyclohexyl, or lower hydrocarbon carboxylic acyl and each of Z¹, Z², and Z³ is a carbon-carbon single bond or a carbon-carbon double bond, provided that (1) when Z¹ is a double bond then each of Z² and Z³ is a single bond and (2) when Z¹ is a single bond then each of Z² and Z³ is a single bond or each of Z² and Z³ is a double bond or Z² is a double bond and Z³ is a single bond.

3. The process according to claim 2 wherein said compound is allyl alcohol, acrylonitrile, acrylic aldehyde, methyl vinyl ketone, or 3-oxo-6-carbomethoxy-n-hex-1-ene.

4. The process according to claim 3 wherein the microorganism is of the genus Saccharomyces.

5. The process according to claim 3 wherein the microorganism is of the genus Schizosaccharomyces.

6. The process according to claim 2 wherein said compound is allyl alcohol, acrylonitrile, or acrylic aldehyde.

7. The process according to claim 6 wherein the microorganism is of the genus Saccharomyces.

8. The process according to claim 6 wherein the microorganism is of the genus Schizosaccharomyces.

9. The process according to claim 8 wherein the microorganism is selected from the group consisting of *Schizosaccharomyces pombe* ATCC 2476, *Schizosaccharomyces malidevorans* CBS 5557, *Saccharomyces cerevisieae* ATCC 4097, and *Saccharomyces uvarum* ATCC 10609.

10. The process according to claim 8 wherein the microorganism is *Schizosaccharomyces pombe* ATCC 2476.

11. The process according to claim 10 wherein the compound is allyl alcohol.

12. The process according to claim 3 wherein R¹ is ethyl.

13. The process according to claim 3 wherein R¹ is methyl.

14. The process according to claim 13 wherein R² is 3-oxo-6-carbomethoxy-n-hexyl.

15. The process according to claim 14 wherein the microorganism is of the genus Schizosaccharomyces.

16. The process according to claim 14 wherein the microorganism is Schizosaccharomyces ATCC 2476 and said compound is allyl alcohol.

* * * * *